United States Patent
Kopp et al.

[11] Patent Number: 5,641,904
[45] Date of Patent: Jun. 24, 1997

[54] METHOD AND APPARATUS FOR DETECTING DRIVE LINE SYSTEM IMBALANCE

[75] Inventors: Gary E. Kopp, Shelby Twp.; Paul R. Goodes, Troy, both of Mich.

[73] Assignee: Ford Motor Company, Dearborn, Mich.

[21] Appl. No.: 568,713

[22] Filed: Dec. 7, 1995

[51] Int. Cl.[6] ........................................... G01M 1/00
[52] U.S. Cl. ................................................ 73/457; 73/593
[58] Field of Search ........................ 73/457, 962, 465, 73/466, 593, 660

[56] References Cited

U.S. PATENT DOCUMENTS

| | | | |
|---|---|---|---|
| 3,903,738 | 9/1975 | Malchow | 73/136 R |
| 3,948,106 | 4/1976 | Armbruster | 73/457 |
| 3,950,987 | 4/1976 | Slezinger et al. | 73/141 A |
| 4,653,324 | 3/1987 | Nugier | 73/460 |
| 4,885,707 | 12/1989 | Nichol et al. | 364/551.01 |
| 4,898,026 | 2/1990 | Damitz | 73/118.1 |
| 4,939,985 | 7/1990 | Von Thun | 73/118.1 |
| 4,977,516 | 12/1990 | Shepherd | 364/508 |
| 5,033,292 | 7/1991 | Dennis | 73/118.1 |
| 5,218,870 | 6/1993 | Komurasaki et al. | 73/654 |
| 5,260,684 | 11/1993 | Metzmaker | 340/457.1 |
| 5,313,407 | 5/1994 | Tiernan et al. | 364/508 |
| 5,320,409 | 6/1994 | Katoh et al. | 297/284.6 |
| 5,323,639 | 6/1994 | Komurasaki et al. | 73/35 |
| 5,360,080 | 11/1994 | Yamazaki | 180/300 |
| 5,365,787 | 11/1994 | Hernandez et al. | 73/660 |
| 5,419,192 | 5/1995 | Maxwell et al. | 73/462 |
| 5,431,049 | 7/1995 | Kopp | 73/457 |
| 5,465,624 | 11/1995 | Tseytlin et al. | 73/653 |

*Primary Examiner*—Hezron E. Williams
*Assistant Examiner*—Richard A. Moller
*Attorney, Agent, or Firm*—Joseph W. Malleck, Esq.; Roger L. May, Esq.

[57] ABSTRACT

An apparatus for detecting drive line system imbalances in an automotive vehicle includes an angular position and speed sensor located at a preselected position spaced from, but associated with the drive shaft in non-contacting relationship therewith, the sensor generates a signal responsive to the speed and angular position of the drive shaft relative to the preselected reference point. The apparatus also includes at least one vibration sensor located at a preselected position, spaced from, but associated with, the drive line in non-contacting relationship therewith. The vibration sensor detects the drive line vibration and generates a signal responsive thereto. A signal analyzer receives the signals generated by the angular position and speed sensor as well as the vibration sensor and calculates any imbalance in the drive line system and presents counterweight and position parameters for correcting any system imbalance.

16 Claims, 3 Drawing Sheets

5,641,904

METHOD AND APPARATUS FOR DETECTING DRIVE LINE SYSTEM IMBALANCE

BACKGROUND OF THE INVENTION

1. Field of the Invention

The present invention relates generally to a method and apparatus for detecting drive line system imbalances. More specifically, the present invention relates to a method and apparatus for detecting system imbalances in a drive line assembly for an automotive vehicle using non-contacting vibration sensors.

2. Description of the Related Art

Generally speaking, automotive vehicles require three basic components: a power plant, such as an internal combustion engine, a drive line system or drive train, as it is sometimes known in the art, and a plurality of rotatably driven wheels. A typical drive line system may include a transmission, a drive shaft and an axle connected between the engine and the driven wheels. Engine torque and speed are converted in the transmission in accordance with the tractive-power demand of the wheels and translated to the drive shaft. In turn, the drive shaft transmits rotational power from the transmission to the driven wheels via the axle assembly. The axle assembly includes a differential which is operatively coupled to the drive shaft through a pinion nose. A pair of output axle shafts connect the differential to the driven wheels.

The drive shaft typically includes an elongated tubular member which is operatively coupled to the transmission and axle assembly through a pair of universal joints or other similar coupling disposed on either end of the shaft. Alternatively, the drive shaft may include two or more elongated tubular members which are connected together by a universal joint or some other similar coupling device and connected between the transmission and axle assembly as above-discussed. Additionally, a center bearing is often employed between the transmission and axle assembly to support the drive shaft relative to the body of the vehicle.

The individual components of the drive line system discussed above often include inherent or residual imbalances due to variations in manufacturing tolerances. While steps can be taken to balance the individual components, residual imbalances often still remain. When the individual components are assembled into the drive line system, the residual imbalances can "stack up" such that they combine to produce a relatively high level of imbalance. Automotive drive line systems which embody these characteristics are unacceptable because they produce drive line vibration and boom.

It is known in the related art to balance the drive line system prior to installation into the vehicle. Many fixtures are known in the art for performing this function and typically rely on vibration measuring devices physically coupled to the drive line system to identify and thereafter correct the imbalances.

Still, this is often not enough to eliminate objectional vibration in the drive line system of a fully assembled automotive vehicle. Thus, devices have been proposed in the related art which seek to identify and correct drive line system imbalances at the terminal stage of vehicle production and prior to shipment of the vehicle. However, these devices suffer from the disadvantage that an additional step in the manufacturing process must be added in order that vibration sensing instrumentation can be physically coupled to the drive line system of each vehicle. This is time consuming and labor intensive. In short, drive line system balancing as employed in the related art for a fully assembled automotive vehicle is presently not cost effective.

Accordingly, there is a need in the art for an apparatus which can detect and perform drive line system balancing in a fully assembled automotive vehicle in high volume production environments which is transparent to the current workload. More particularly, there is a need in the art for an apparatus for performing drive line system balancing which does not rely on the physical attachment of vibration sensing instrumentation to the automotive vehicle in order to detect and correct system imbalances.

SUMMARY OF THE INVENTION

The present invention is an apparatus for detecting drive line system imbalances in a fully assembled automotive vehicle. The apparatus includes an angular position and speed sensor spaced from, but associated with, the drive shaft in non-contacting relationship therewith. This sensor generates a signal responsive to the speed and angular position of the drive shaft relative to a preselected reference point on the drive shaft. The apparatus also includes at least one vibration sensor located beneath the vehicle at a preselected position spaced from, but associated with, a drive shaft of the drive line system in non-contacting relationship therewith. The vibration sensor detects drive line vibration and generates a signal responsive thereto without physically contacting the drive line. The apparatus further includes a signal analyzer which receives the signals generated by the angular position and speed sensor as well as the vibration sensor and calculates an imbalance in the drive line system. The signal analyzer also presents counterbalance weight and position parameters for correcting any drive line system imbalance.

One advantage of the present invention is that the apparatus disclosed herein can detect drive line system imbalances in fully assembled automotive vehicles in high volume production environments. Another advantage of the present invention is that the apparatus disclosed herein is transparent to the current workload at the terminal portion of the manufacturing process. Still another advantage of the present invention is that the apparatus employs vibration sensors which are disposed in non-contacting relation with respect to the drive line system. Thus, there is no time or labor required to physically attach vibration sensors to the drive line system as is commonly performed in the related art.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
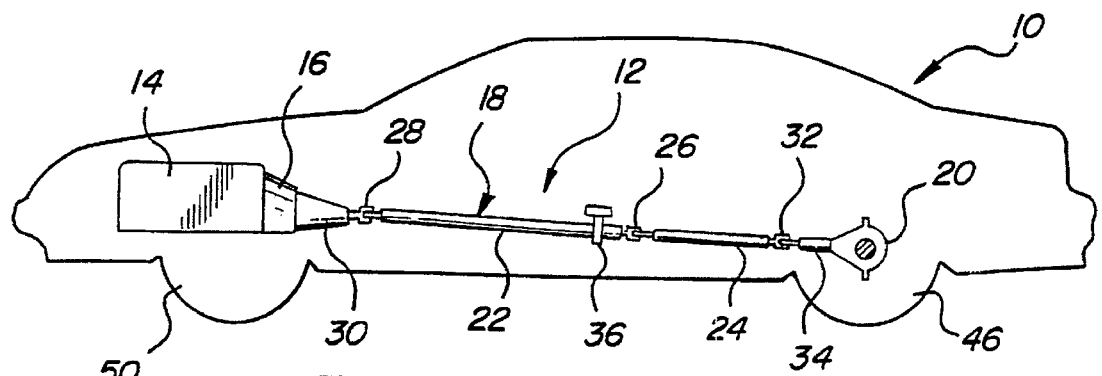
FIG. 1 is a side view of a drive line system shown in its operational mode in conjunction with an automotive vehicle.

Referring now to the drawings, and in particular to FIG. 1, an automotive vehicle is shown in silhouette at 10. The automotive vehicle 10 has a drive line system, generally indicated at 12, and an engine 14. The drive line system 12 includes a transmission 16, drive shaft 18 and a rear axle 20 as is commonly known in the art. The drive shaft 18 may include one or more tubular shafts. By way of illustration and not by way of limitation, the drive shaft 18 shown in the figures includes a front shaft 22 and a rear shaft 24. A universal joint 26, or some other suitable device, operatively couples the front shaft 22 and the rear shaft 24 together. Similarly, a universal joint 28 is located between a transmission extension 30 and the front shaft 22. A universal joint 32, or some other suitable device, is employed to couple the rear shaft 24 to the rear axle 20 through a pinion nose 34. A center bearing 36 is often employed to support the drive shaft 18 relative to the body of the automotive vehicle 10.

Figure 2:
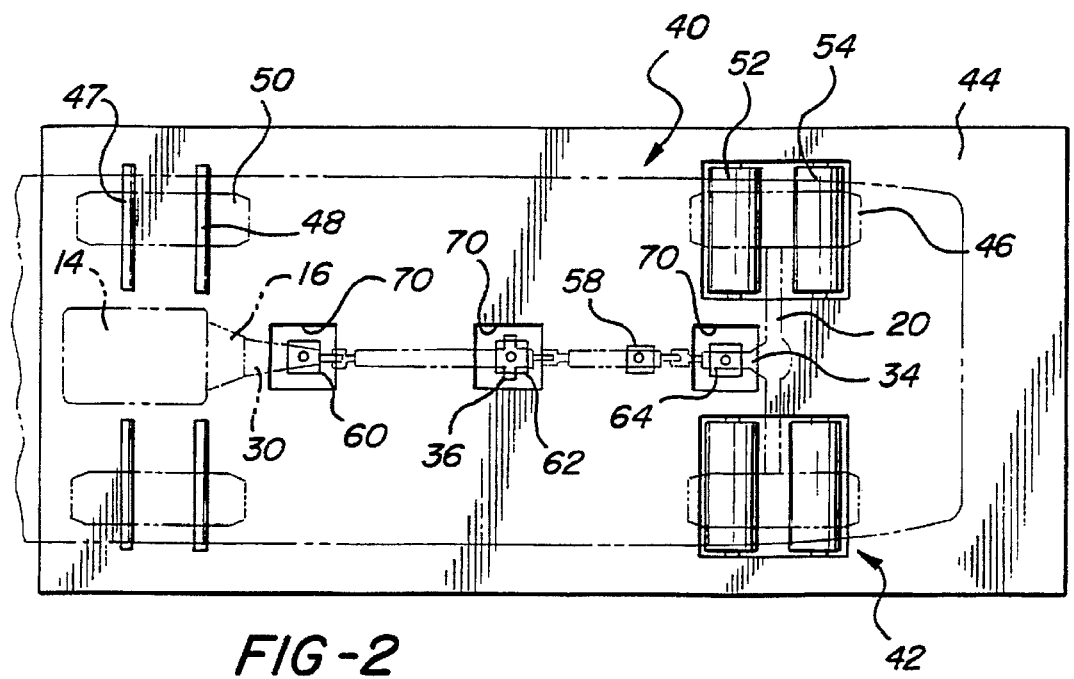
FIG. 2 is a top view of an apparatus for detecting drive line system imbalances, according to the present invention, shown in conjunction with the automotive vehicle of FIG. 1.
Figure 3:
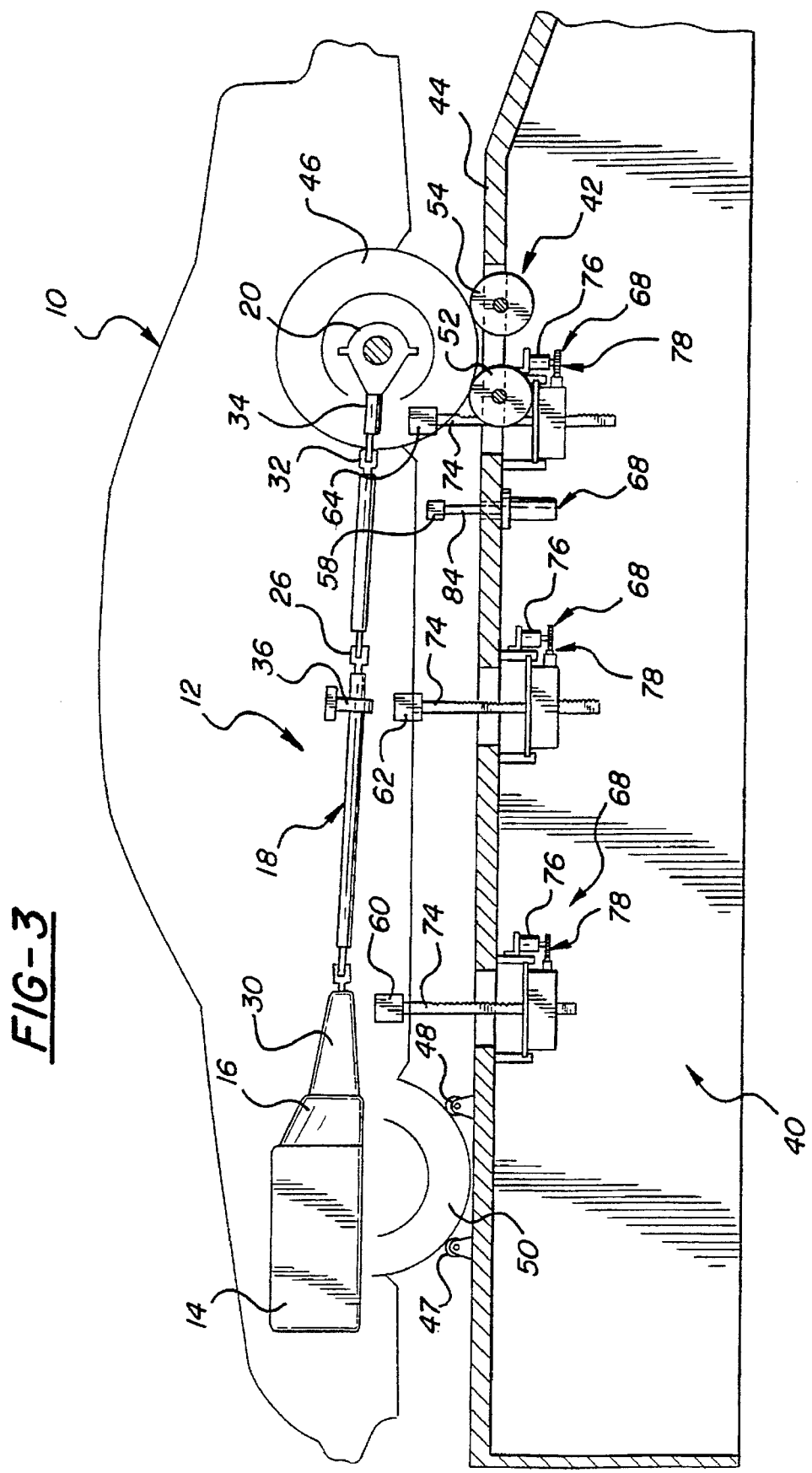
FIG. 3 is a side view of the apparatus of FIG. 2 shown in conjunction with the automotive vehicle of FIG. 1.
Figure 5:
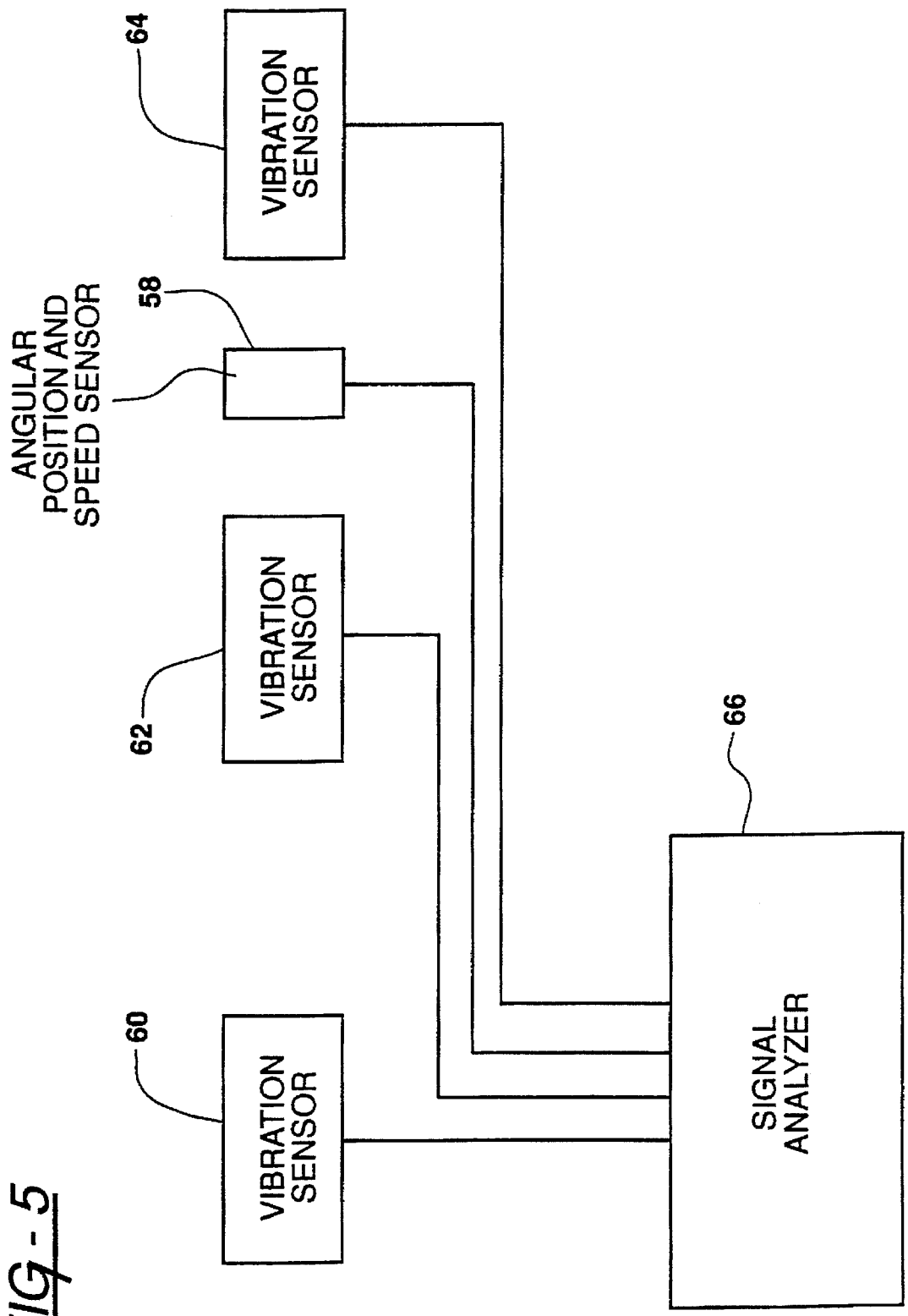
FIG. 5 is a schematic view of controls for the apparatus of FIGS. 1 and 2.

Referring now to FIGS. 2 and 3, an apparatus for detecting drive line system imbalances in the automotive vehicle 10 according to the present invention, is generally shown at 40. The apparatus 40 includes a chassis dynamometer, generally indicated at 42, having a support surface 44 for supporting the automotive vehicle 10 while the chassis dynamometer 42 is operatively engaged by driven rear wheels 46 of the automotive vehicle 10. The chassis dynamometer 42 may also include a pair of front rollers 47, 48 for front wheels 50 of the automotive vehicle 10. In addition, the chassis dynamometer 42 includes a pair of rear rollers 52, 54 which are driven upon engagement with the rear wheels 46 of the automotive vehicle 10.

The apparatus 40 also includes an angular position and speed sensor 58 which is located at a preselected position spaced from, but associated with the drive shaft 18 in non-contacting relationship therewith. More specifically, the angular position and speed sensor is a fiber optic tactometer 58 which monitors the angular position and speed of the drive shaft 18 relative to a preselected reference point thereon. The preselected reference point may be a paint strip, reference sticker or any other suitable device employed to indicate the reference point on the drive shaft 18. The fiber optic tactometer 58 generates a signal responsive to the speed and angular position of the drive shaft 18 and relative to the preselected reference point thereon.

In addition, the apparatus 40 includes at least one but preferably three vibration sensors 60, 62, 64 located at a preselected position, spaced from, but associated with, the drive line 12 in non-contacting relationship therewith. More specifically, the apparatus 40 includes a vibration sensor 60 which is located in a preselected position spaced from, but in non-contacting relationship with the transmission 16 so as to sense the vibration therefrom and generate signals responsive thereto. As illustrated in the figures, the vibration sensor 60 is specifically disposed in non-contacting relationship with the transmission extension 30.

The apparatus 40 may include a vibration sensor 62 which is located at a preselected position spaced from, but in non-contacting relationship with, the center bearing 36. In this way, the vibration sensor 62 may sense the vibration from the center bearing 36 and generate signals responsive thereto. Furthermore, the apparatus 40 may also include a vibration sensor 64 which is located at a preselected position spaced from, but in non-contacting relationship, with the axle 20 so as to sense the vibration therefrom and generate signals responsive thereto. As shown in the figures, the vibration sensor 64 is specifically disposed in non-contacting relationship with respect to the pinion nose 34 of the axle 20.

The non-contacting vibration sensors 60, 62, 64 may be either a laser vibrometer, deflectometer or microwave sensor. The laser vibrometer, deflectometer and microwave sensors send energy in either a beam or a wave directed at the drive train 12 and measure the highest point of vibration in a single plane at each of the three points discussed above. More specifically, any of the sensors can be employed to measure the highest point of displacement, velocity or acceleration at the points mentioned. From this information, the vibration and any imbalance can be determined as discussed in greater detail below.

The apparatus 40 includes a signal analyzer 66 which receives the signals generated by the fiber optic tactometer 58 as well as the vibration sensors 60, 62, 64 and calculates any imbalance in the drive line system 12 and presents counterbalance weight and position parameters for correcting any system imbalance. The operation of the signal analyzer 66 will be discussed in greater detail below.

Figure 4:
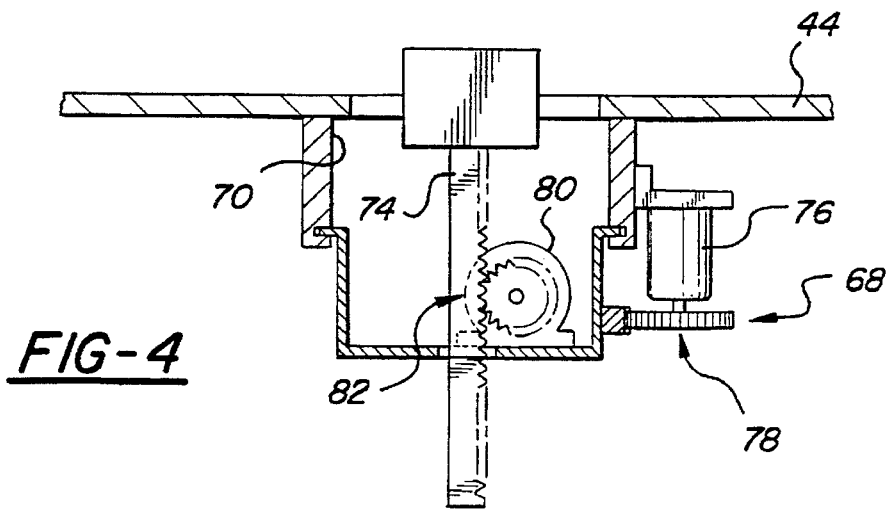
FIG. 4 is a cross-sectional side view of a sensor position actuator of the apparatus of FIGS. 2 and 3.

The apparatus 40 also includes a sensor position actuator, generally indicated at 68 in FIG. 4, and associated with each sensor 58, 60, 62, 64. The actuator 68 locates the fiber optic tactometer 58 as well as the vibration sensors 60, 62 and 64 in a proper position relative to a preselected point on the drive line. To this end, the support surface 44 on the chassis dynamometer 42 includes at least one, but preferably three bays 70 defined therein. The fiber optic tactometer 58 as well as each of the three vibration sensors 60, 62 and 64 are housed within the bays 70 in the support surface 44 of the chassis dynamometer. The sensors 58, 60, 62, 64 are operatively moveable between a first position below the support surface 44 and a second, preselected position raised from the support surface 44 and spaced from, but associated with, the drive line system 12 in non-contacting relationship as noted above. Accordingly, the sensor position actuator 68 includes a pedestal 74 and at least one motor with a gear train interconnecting the pedestal 74 with the motor. More specifically, the actuator 68 includes lateral position motors 76 and gear trains 78 for moving the sensors 58, 60, 62 and 64 in the lateral direction as viewed in FIGS. 2, 3 and 4. Similarly, the actuator 68 includes vertical position motors 80 and gear trains 82 associated therewith for moving the sensors 58, 60, 62 and 64 in the vertical direction as viewed in FIGS. 3 and 4. It should be noted that while the fiber optic tactometer 58 is shown mounted to a separate pedestal 84 in the figures, it is also possible to mount this device to the pedestal 74 employed with the vibration sensor 64 located opposite the pinion nose 34 on the axle 20. In addition, the sensor position actuator 68 may include an optical positioning system for locating the fiber optic tactometer 58 as well as the vibration sensors 60, 62, 64 in proper position relative to the preselected points on the drive line.

The present invention is also a method of detecting drive line system imbalances in the automotive vehicle 10 and will be described in greater detail below.

Initially, the automotive vehicle 10 is driven onto the chassis dynamometer at the terminal portion of an assembly line for the automotive vehicle 10 and the vehicle 10 is accelerated to find its neutral running position. The sensors 58, 60, 62 and 64 are then moved from their first position below the support surface 44 on the chassis dynamometer 42 to their second preselected position disposed spaced from, but in non-contacting relationship with respect to the drive line system 12. The speed of the automotive vehicle 10 is adjusted to a predetermined value and the sensors 58, 60, 62 and 64 generate signals corresponding to the angular position and speed of the drive shaft 18 as well as the vibration in the drive line system 12, respectively. The signals are then received by the signal analyzer 66 and any imbalance in the drive line system 12 is calculated, in part, by comparing the signals generated by the sensors 58, 60, 62, 64 with influence coefficient data. The influence coefficient data may be generated for any specific drive train for any given vehicle and gives base line information as a reference for calibrating the drive train system imbalance. Once this comparison is complete, the apparatus 40 presents counterbalance weight and position parameters for correcting any system imbalance. In the event of any system imbalances the automotive vehicle 10 may be tagged, and corrected prior to shipment.

In this way, drive line system vibration balancing may be performed in a fully assembled automotive vehicle in high production volume environments in a way which is substantially transparent to the current workload. In addition, drive line system balancing may be performed without the physical attachment of any vibration sensing instrumentation to the automotive vehicle in order to detect and correct system imbalances.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus for detecting drive line system imbalances in an automotive vehicle, said apparatus comprising:

a chassis dynamometer having a support surface for supporting an automotive vehicle while said chassis dynamometer is operatively engaged by driven wheels of the automotive vehicle, said support surface including at least one bay defined therein;

an angular position and speed sensor and at least one vibration sensor housed within said bay in said support surface of said chassis dynamometer, said sensors being operatively moveable between a first position below said support surface and a second preselected position raised above said support surface and spaced from but associated with a drive shaft of a drive line system in non-contacting relationship therewith;

said angular position and speed sensor generating a signal responsive to the speed and angular position of the drive shaft relative to a preselected reference point therein, said at least one vibration sensor detecting drive line vibration and generating a signal responsive thereto; and a signal analyzer which receives the signals generated by said angular position and speed sensor as well as said at least one vibration sensor and calculates any imbalance in the drive line system and presents counterbalance weight and position parameters for correcting any system imbalance.

2. An apparatus as set forth in claim 1 wherein said at least one vibration sensor is located at a preselected position spaced from, but in non-contacting relationship with a transmission of the drive line system so as to sense the vibration therefrom and generate signals responsive thereto.

3. An apparatus as set forth in claim 1 wherein said at least one vibration sensor is located at a preselected position spaced from, but in non-contacting relationship with a center bearing of the drive line system to so as to sense the vibration therefrom and generate signals responsive thereto.

4. An apparatus as set forth in claim 1 wherein said at least one vibration sensor is located at a preselected position spaced from, but in non-contacting relationship with an axle of the drive line system so as to sense the vibration therefrom and generate signals responsive thereto.

5. An apparatus as set forth in claim 1 wherein said angular position and speed sensor is a fiber optic tactometer which monitors the angular position and speed of the drive shaft relative to a preselected reference point thereon.

6. An apparatus as set forth in claim 1 wherein said at least one vibration sensor is a laser vibrometer.

7. An apparatus as set forth in claim 1 wherein said at least one vibration sensor is a deflectometer.

8. An apparatus as set forth in claim 1 wherein said at least one vibration sensor is a microwave sensor.

9. An apparatus as set forth in claim 1 wherein said apparatus includes a sensor position actuator which locates said angular position and speed sensor as well as said at least one vibration sensor in a proper position relative to a preselected point on the drive line system.

10. An apparatus as set forth in claim 9 wherein said sensor position actuator includes an optical positioning system for locating said angular position and speed sensor as well as said at least one vibration sensor in a proper position relative to a preselected point on the drive line system.

11. An apparatus as set forth in claim 9 wherein said sensor position actuator includes a pedestal and at least one motor with a gear train interconnecting said pedestal and said motor, said angular position and speed sensor as well as said at least one vibration sensor supported by said pedestal and moveable thereby into said preselected non-contacting position relative to the drive line system.

12. An apparatus as set forth in claim 1 wherein said apparatus includes at least three vibration sensors located at preselected positions spaced from, but in non-contacting relationship with, a transmission, center bearing and axle, respectively of the drive line system so as to sense the vibration therefrom and generate signals responsive thereto.

13. An apparatus as set forth in claim 12 wherein said at least three vibration sensors sense the vibration in a single plane generated by the transmission, center bearing and axle, respectively.

14. A method of detecting drive line system imbalances in an automotive vehicle, said method including the steps of:

positioning an automotive vehicle on a chassis dynamometer having a support surface for supporting the automotive vehicle while said chassis dynamometer is operatively engaged by driven wheels of the automotive vehicle, moving an angular position and speed sensor and at least one vibration sensor housed within a bay in said support surface of said chassis dynamometer from a first position below said support surface to a second preselected position raised above said support surface and spaced from but associated with a drive shaft of a drive line system of the automotive vehicle in non-contacting relation therewith;

generating a signal in response to an angular position and speed of a drive shaft of the drive line system from said sensor placed in non-contacting relationship therewith;

detecting vibration in the drive line system from said at least one sensor disposed spaced from, but in non-contacting relationship with respect to the drive line system and generating a signal corresponding thereto; and calculating any imbalance in the drive line system based on said signals from the angular position and speed sensor as well as the at least one vibration sensor and determining the corrective counterweight and position thereof to eliminate any system imbalance.

15. A method as set forth in claim 14 wherein the step of determining corrective counterweight and position include comparing any imbalance in the drive line system with reference data determined for the specific drive line system being balanced.

16. A method as set forth in claim 14 including the step of accelerating the automotive vehicle until it reaches a predetermined neutral running position.

* * * * *